United States Patent
Kobayashi et al.

(10) Patent No.: US 12,454,010 B1
(45) Date of Patent: Oct. 28, 2025

(54) CUTTING TOOL

(71) Applicant: Sumitomo Electric Industries, Ltd., Osaka (JP)

(72) Inventors: Fumiyoshi Kobayashi, Osaka (JP); Anongsack Paseuth, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/995,947

(22) PCT Filed: May 29, 2024

(86) PCT No.: PCT/JP2024/019738
§ 371 (c)(1),
(2) Date: Jan. 17, 2025

(51) Int. Cl.
*B23B 27/14* (2006.01)

(52) U.S. Cl.
CPC ........ *B23B 27/14* (2013.01); *B23B 2228/105* (2013.01); *B23B 2228/36* (2013.01)

(58) Field of Classification Search
None
See application file for complete search history.

(56) References Cited

U.S. PATENT DOCUMENTS

| | | | |
|---|---|---|---|
| 2011/0135898 A1* | 6/2011 | Bohlmark | C23C 14/50 427/255.18 |
| 2011/0188950 A1* | 8/2011 | Ahlgren | C23C 14/024 427/580 |
| 2014/0370309 A1 | 12/2014 | Endler et al. | |
| 2016/0040279 A1* | 2/2016 | Setoyama | C04B 41/52 428/216 |
| 2018/0281078 A1* | 10/2018 | Hirano | C04B 41/52 |
| 2023/0234141 A1 | 7/2023 | Harada et al. | |
| 2024/0024957 A1* | 1/2024 | Schier | B23B 27/148 |
| 2024/0198430 A1 | 6/2024 | Paseuth et al. | |

FOREIGN PATENT DOCUMENTS

| | | |
|---|---|---|
| JP | 2005-138209 A | 6/2005 |
| JP | 2015-505902 A | 2/2015 |
| WO | 2022/230363 A1 | 11/2022 |
| WO | 2023/144867 A1 | 8/2023 |

OTHER PUBLICATIONS

Written Opinion mailed on Jul. 16, 2024 received for PCT Application PCT/JP2024/019738, filed on May 29, 2024, 7 pages including English Translation.

* cited by examiner

*Primary Examiner* — Seth Dumbris
(74) *Attorney, Agent, or Firm* — XSENSUS LLP

(57) ABSTRACT

A cutting tool, comprising a substrate and a coating,
wherein the coating comprises a first layer consisting of multiple hard particles,
in the first layer, $N_{Si}/(N_{Ti}+N_{Si})$ is 0.01 or more and 0.10 or less, and $N_C/(N_C+N_N)$ is 0.60 or more and 0.85 or less,
the hard particles have a stacked structure in which first unit layers and second unit layers are stacked alternately,
the ratio of the number of silicon atoms to the sum of the number of titanium atoms and the number of silicon atoms in the first unit layers, x1, is higher than that of in the second unit layers, x2, and
the ratio of the number of carbon atoms to the sum of the number of carbon atoms and the number of nitrogen atoms in the first unit layers, y1, is higher than that of in the second unit layers, y2.

8 Claims, 4 Drawing Sheets

CUTTING TOOL

CROSS-REFERENCE TO RELATED APPLICATION

The present application is based on PCT/JP2024/019738, filed May 29, 2024, the entire contents of which are incorporated herein by reference.

TECHNICAL FIELD

The present disclosure relates to a cutting tool.

BACKGROUND ART

Cutting tools having a TiSiCN film on the substrate thereof have been developed until now for improving the abrasion resistance (for example, PTL 1).

CITATION LIST

Patent Literature

PTL 1: WO 2022/230363

SUMMARY OF INVENTION

A cutting tool of the present disclosure is a cutting tool comprising a substrate and a coating disposed on the substrate,
  wherein the coating comprises a first layer,
  the first layer consists of multiple hard particles,
  the hard particles consist of titanium, silicon, carbon, and nitrogen,
  the hard particles have a cubic crystal structure,
  the first layer has a columnar structure,
  in the first layer, the average of the ratio of the number of atoms of the silicon $N_{Si}$ to the sum of the number of atoms of the titanium $N_{Ti}$ and the number of atoms of the silicon $N_{Si}$, $N_{Si}/(N_{Ti}+N_{Si})$, is 0.01 or more and 0.10 or less,
  in the first layer, the average of the ratio of the number of atoms of the carbon $N_C$ to the sum of the number of atoms of the carbon $N_C$ and the number of atoms of the nitrogen $N_N$, $N_C/(N_C+N_N)$, is 0.60 or more and 0.85 or less,
  the hard particles have a stacked structure in which first unit layers and second unit layers are stacked alternately,
  the first unit layers and the second unit layers each consist of titanium, silicon, carbon, and nitrogen,
  the ratio of the number of atoms of the silicon to the sum of the number of atoms of the titanium and the number of atoms of the silicon in the first unit layers, x1, is higher than the ratio of the number of atoms of the silicon to the sum of the number of atoms of the titanium and the number of atoms of the silicon in the second unit layers, x2, and
  the ratio of the number of atoms of the carbon to the sum of the number of atoms of the carbon and the number of atoms of the nitrogen in the first unit layers, y1, is higher than the ratio of the number of atoms of the carbon to the sum of the number of atoms of the carbon and the number of atoms of the nitrogen in the second unit layers, y2.

DETAILED DESCRIPTION

Figure 1:
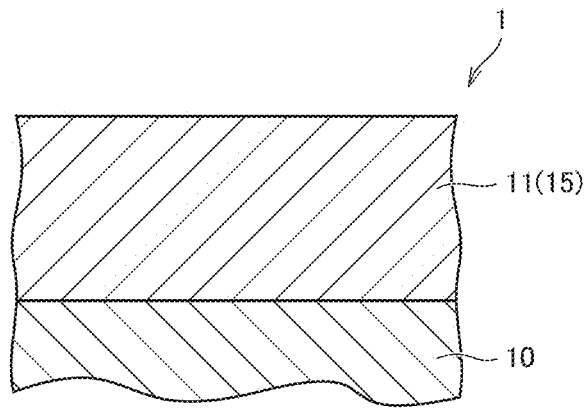
FIG. 1 is a schematic diagram showing an exemplary section of a cutting tool according to Embodiment 1.

Problem to be Solved by the Present Disclosure

A cutting tool with a TiSiCN film, having high hardness, is high in abrasion resistance. Meanwhile, if chromium molybdenum steel (SCM415) is subjected to continuous machining with the cutting tool, the affinity between silicon and iron is high, so that welding is caused to make the cutting tool reach the tool life. A cutting tool has therefore been desired that can have a long tool life especially even after use for continuous machining of the chromium molybdenum steel.

An object of the present disclosure is to provide a cutting tool that can have a long tool life especially even after use for continuous machining of the chromium molybdenum steel.

Advantageous Effect of the Present Disclosure

The present disclosure enables providing a cutting tool that can have a long tool life especially even after use for continuous machining of chromium molybdenum steel.

DESCRIPTION OF EMBODIMENTS

Embodiments of the present disclosure will be first enumerated for description.

(1) A cutting tool of the present disclosure is a cutting tool, comprising a substrate and a coating disposed on the substrate,
  wherein the coating comprises a first layer,
  the first layer consists of multiple hard particles,
  the hard particles consist of titanium, silicon, carbon, and nitrogen,
  the hard particles have a cubic crystal structure,
  the first layer has a columnar structure,
  in the first layer, the average of the ratio of the number of atoms of the silicon $N_{Si}$ to the sum of the number of atoms of the titanium $N_{Ti}$ and the number of atoms of the silicon $N_{Si}$, $N_{Si}/(N_{Ti}+N_{Si})$, is 0.01 or more and 0.10 or less,
  in the first layer, the average of the ratio of the number of atoms of the carbon $N_C$ to the sum of the number of atoms of the carbon $N_C$ and the number of atoms of the nitrogen $N_N$, $N_C/(N_C+N_N)$, is 0.60 or more and 0.85 or less,
  the hard particles have a stacked structure in which first unit layers and second unit layers are stacked alternately,
  the first unit layers and the second unit layers each consist of titanium, silicon, carbon, and nitrogen, the ratio of the number of atoms of the silicon to the sum of the number of atoms of the titanium and the number of atoms of the silicon in the first unit layers, x1, is higher than the ratio of the number of atoms of the silicon to the sum of the number of atoms of the titanium and the number of atoms of the silicon in the second unit layers, x2, and the ratio of the number of atoms of the carbon to the sum of the number of atoms of the carbon and the number of atoms of the nitrogen in the first unit layers, y1, is higher than the ratio of the number of atoms of the carbon to the sum of the number of atoms of the carbon and the number of atoms of the nitrogen in the second unit layers, y2.

The present disclosure enables providing a cutting tool that can have a long tool life especially even after use for continuous machining of chromium molybdenum steel.

(2) In the above-mentioned (1), the first unit layers may have an average thickness of 2 nm or more and 15 nm or less, and the second unit layers may have an average thickness of 2 nm or more and 15 nm or less. This further improves the tool life.

(3) In the above-mentioned (1) or (2), the average of the total thickness of a first unit layer and a second unit layer adjacent thereto may be 4 nm or more and 30 nm or less. This further improves the tool life.

(4) In any of the above-mentioned (1) to (3), the first layer may have a thickness of 1.0 μm or more and 15 μm or less. This further improves the tool life.

(5) In any of the above-mentioned (1) to (4), the coating may comprise a second layer disposed between the substrate and the first layer, and the second layer may comprise at least one selected from the group consisting of a TiN layer, a TiC layer, a TiCN layer, a TiBN layer, a TiCNO layer, and an $Al_2O_3$ layer.

This further improves the tool life.

(6) In any of the above-mentioned (1) to (5), the coating comprises a third layer disposed on the side of the first layer nearer to the surface of the coating, and the third layer may comprise at least one selected from the group consisting of a TiN layer, a TiC layer, a TiCN layer, a TiBN layer, a TiCNO layer, and an $Al_2O_3$ layer.

This enables facilitating the discrimination of used portions of the cutting tool after use for cutting machining, and further improving the slidability of the coating.

(7) In any of the above-mentioned (1) to (6), the x1 may be 0.01 or more and 0.11 or less, and the y1 may be 0.60 or more and 0.85 or less. This improves the hardness, the oxidation resistance, and the slidability of the first layer in a balanced manner.

(8) In the above-mentioned (7), the difference between the x1 and the x2 may be 0.01 or more and 0.07 or less, and the difference between the y1 and the y2 may be 0.01 or more and 0.10 or less. This improves the hardness, the oxidation resistance, and the slidability of the first layer in a balanced manner.

DETAILS OF EMBODIMENTS OF THE PRESENT DISCLOSURE

With reference to the following drawings, the cutting tool of the present disclosure will be described. In the drawings of the present disclosure, the same reference signs indicate the same portions or the corresponding portions. The measurement relationships between the lengths, the widths, the thicknesses, and the depths are optionally modified for clarifying and simplifying the drawings, and do not necessarily show actual measurement relationships.

The formal expression "A to B" as used in the present disclosure means A or more and B or less. If a unit is attached to only B without any unit attached to A, the unit of A is the same as the unit of B.

If a compound is represented by a chemical formula in the present disclosure without particular limitation of the atomic ratio, the atomic ratio shall include any conventionally known atomic ratio, and should not be necessarily limited to only the ranges of stoichiometric atomic ratios.

If one or more numerical values are described as each of the lower limit and the upper limit of a numerical range in the present disclosure, also disclosed shall be the combination of any one numerical value described as the lower limit and any one numerical value described as the upper limit.

The terms "comprise", "contain", and "have", and the variations thereof are open-end terms. The open-end terms may further include an additional element (or additional elements) besides an essential element (or elements) or may not include the element (or these elements). The description "consist of" is a closed-end term. Even a configuration expressed by the closed-end term can however include an additional element (or additional elements) as an impurity (or impurities) usually accompanying an essential element (or elements), or an additional element (or additional elements) not related to the target technique.

Embodiment 1: Cutting Tool

A cutting tool in an embodiment of the present disclosure (hereinafter also referred to as the "present embodiment") will be described with FIGS. 1 to 4. A cutting tool 1 of the present disclosure is a cutting tool 1, comprising a substrate 10 and a coating 15 disposed on substrate 10, wherein coating 15 comprises a first layer 11, first layer 11 consists of multiple hard particles, the hard particles consist of titanium, silicon, carbon, and nitrogen, the hard particles have a cubic crystal structure, first layer 11 has a columnar structure, in first layer 11, the average of the ratio of the number of silicon atoms $N_{Si}$ to the sum of the number of titanium atoms $N_{Ti}$ and the number of silicon atoms $N_{Si}$, $N_{Si}/(N_{Ti}+N_{Si})$, is 0.01 or more and 0.10 or less, in first layer 11, the average of the ratio of the number of carbon atoms $N_C$ to the sum of the number of carbon atoms $N_C$ and the number of nitrogen atoms $N_N$, $N_C/(N_C+N_N)$, is 0.60 or more and 0.85 or less, the hard particles have a stacked structure in which first unit layers and second unit layers are stacked alternately, the first unit layers and the second unit layers each consist of titanium, silicon, carbon, and nitrogen, the ratio of the number of silicon atoms to the sum of the number of titanium atoms and the number of silicon atoms in the first unit layers, x1, is higher than the ratio of the number of silicon atoms to the sum of the number of titanium atoms and the number of silicon atoms in the second unit layers, x2, and the ratio of the number of carbon atoms to the sum of the number of carbon atoms and the number of nitrogen atoms in the first unit layers, y1, is higher than the ratio of the number of carbon atoms to the sum of the number of carbon atoms and the number of nitrogen atoms in the second unit layers, y2.

The cutting tool of the present disclosure can have a long tool life especially even after use for continuous machining of chromium molybdenum steel. Although the reason therefor is not clear, it is conjectured that the reason is as follows.

(i) In the cutting tool of the present embodiment, the coating comprises the first layer consisting of the multiple hard particles. Since the hard particles consist of titanium, silicon, carbon, and nitrogen, and have a cubic crystal structure, the first layer has high hardness. The cutting tool therefore has high abrasion resistance.

(ii) In the first layer of the cutting tool of the present embodiment, the average of the ratio $N_C/(N_C+N_N)$ is 0.60 or more and 0.85 or less, the carbon content is high. This improves the slidability of the first layer, and suppresses the welding of a material to be cut to the cutting tool during cutting.

(iii) The hard particles of the cutting tool of the present embodiment have a stacked structure in which the first unit layers and the second unit layers are stacked alternately. The composition and the crystal lattice discontinue on the interfaces between the first unit layers and the second unit layers. Even though the cutting tool cracks during cutting, the interfaces therefore enable suppressing the development of the cracks.

(iv) In the hard particles of the cutting tool of the present embodiment, the ratio x1 of the first unit layers is higher than the ratio x2 of the second unit layers, and the ratio y1 of the first unit layers is higher than the ratio y2 of the second unit layers. The first unit layers contain silicon and carbon at relatively high contents as compared with the second unit layers. Since the first unit layers contain silicon at a high content, the first unit layers are high in hardness and oxidation resistance. Meanwhile, silicon has high affinity for iron in a material to be cut, and layers containing silicon are generally likely to weld thereto. Since the first unit layers contain carbon at a high content in the present embodiment, the first unit layers improve in slidability, and the welding is suppressed throughout the coating.

<Cutting Tool>

As shown in FIG. 1, cutting tool 1 of the present embodiment comprises substrate 10 and coating 15 disposed on substrate 10. FIG. 1 shows coating 15 constituted of only first layer 11. Coating 15 may at least partially cover a portion of the substrate related to cutting, or may cover the entire surface of the substrate. The portion of the substrate related to cutting means a region within 500 μm from the cutting edge ridgeline on the surface of the substrate. As long as the effect of the present disclosure is not deteriorated, even the coating covering the substrate only partially or the coating having different configurations from one portion to another does not depart from the scope of the present disclosure.

<Type of Cutting Tool>

For example, the cutting tool of the present disclosure can be a drill, an end mill (for example, a ball end mill), an indexable cutting insert for drills, an indexable cutting insert for end mills, an indexable cutting insert for milling, an indexable cutting insert for lathe turning, a metal saw, a gear-cutting tool, a reamer, or a tap.

<Substrate>

In the present embodiment, a conventionally known substrate is usable. For example, the material of the substrate may be cemented carbide (for example, WC-based cemented carbide containing tungsten carbide and cobalt, the cemented carbide can contain, for example, carbonitrides of Ti, Ta, and Nb.), cermet (containing TIC, TiN, TiCN, or others as the main component), high-speed steel, ceramic (for example, titanium carbide, silicon carbide, silicon nitride, aluminum nitride, or aluminum oxide), a cubic boron nitride sintered material, or a diamond sintered material.

The substrate may consist of cemented carbide containing tungsten carbide and cobalt, and the cemented carbide may contain cobalt at a content of 5% by mass or more and 11% by mass or less. This enables the substrate to have excellent balance between hardness and strength at high temperature and excellent characteristics as the substrate for the cutting tool for the above-mentioned use. If WC-based cemented carbide is used as the substrate, the structure thereof may contain free carbon and abnormal layers referred to as η phases or ε phases.

The surface of the substrate may be modified. For example, in the case of cemented carbide, a β-removed layer may be formed on the surface. In the case of cermet, a surface-hardened layer may be formed. Even though the surface of the substrate is modified, the desired effect is exhibited.

If the cutting tool is an indexable cutting insert, the substrate may have a chip breaker or not. The cutting edge ridgeline may have any shape of, for example, a sharp edge (edge that is a line of interaction of the rake face and the flank face), a honed sharp edge (rounded sharp edge), a negative land (chamfered sharp edge), and a sharp edge subjected to the combination of honing processing and negative land processing.

<Coating>

<<Configuration of Coating>>

In the present embodiment, the coating comprises the first layer. As long as the coating of the present embodiment comprises the first layer, the coating may comprise other layers.

Figure 2:
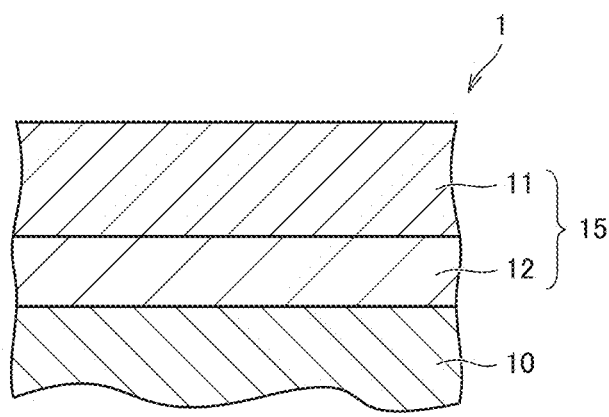
FIG. 2 is a schematic diagram showing another exemplary section of a cutting tool according to Embodiment 1.

As shown in FIG. 2, coating 15 of cutting tool 1 may comprise a second layer 12 disposed between substrate 10 and first layer 11.

Figure 3:
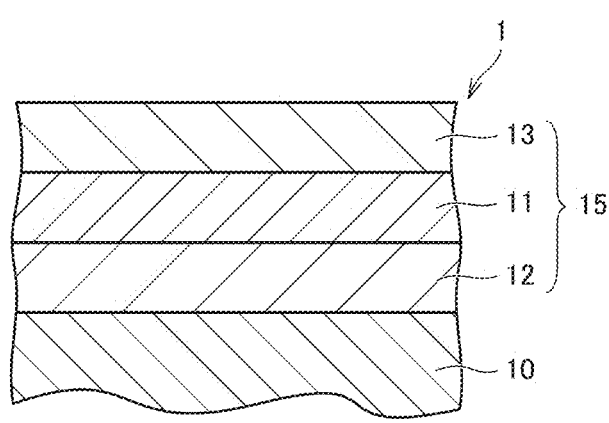
FIG. 3 is a schematic diagram showing another exemplary section of a cutting tool according to Embodiment 1.
Figure 4:
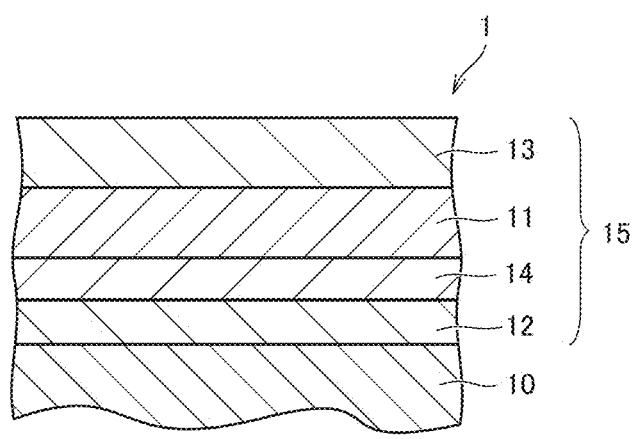
FIG. 4 is a schematic diagram showing another exemplary section of a cutting tool according to Embodiment 1.

As shown in FIG. 3, coating 15 of cutting tool 1 may comprise a third layer 13 disposed on the side of first layer 11 nearer to the surface of coating 15.

Details of the first layer, the second layer, and the third layer will be described below.

<<Thickness of Coating>>

In the present embodiment, the coating may have a thickness of 1 μm or more and 30 μm or less. The thickness of the coating used here means the thickness of the entire coating. If the entire coating has a thickness of 1 μm or more, the coating can have high abrasion resistance. Meanwhile, if the entire coating has a thickness of 30 μm or less, this enables inhibiting great stress applied between the coating and the substrate from exfoliating or breaking the coating. The entire coating may have a thickness of 3 μm or more and 25 μm or less, or 5 μm or more and 20 μm or less.

In the present disclosure, the thickness of the coating is measured in the following procedure. The cutting tool is cut in a section parallel to the normal direction of the surface thereof to obtain a measurement sample having an exposed section of the coating. The measurement sample is observed through a scanning transmission electron microscope (STEM) to measure the thickness of the coating. The measurement sample is a thin section processed, for example, with an ion slicer. Examples of the scanning transmission electron microscope include JEM-2100F (TM), which is available from JEOL Ltd. As the measurement conditions, the acceleration voltage is 200 kV, and the amount of current is 0.3 nA.

The measurement sample is observed at a magnification of 10000. In the electron microscope image, a rectangular measurement visual field is set having "a side that is parallel to the surface of the cutting tool and has a length of 100 µm" and "a side that is longer than the entire thickness of the coating". The thicknesses of the coating are measured at ten points in the measurement visual field. The average value thereof is defined as the "thickness of the coating". The thicknesses (average thicknesses) of the layers described below are also measured and calculated in the same way.

It has been confirmed that even though the thicknesses of the identical sample are measured at randomly changed selected points in the measurement visual field multiple times, the results of measurement scarcely vary.

<First Layer>
<<Composition of First Layer>>

In the present embodiment, the first layer consists of the multiple hard particles. The hard particles consist of titanium, silicon, carbon, and nitrogen. In the first layer of the present embodiment, the average of the ratio of the number of silicon atoms $N_{Si}$ to the sum of the number of titanium atoms $N_{Ti}$ and the number of silicon atoms $N_{Si}$, $N_{Si}/(N_{Ti}+N_{Si})$, is 0.01 or more and 0.10 or less. If the average of $N_{Si}/(N_{Ti}+N_{Si})$ is 0.01 or more, the first layer improves in hardness and oxidation resistance. If the average of $N_{Si}/(N_{Ti}+N_{Si})$ is 0.10 or less, the first layer can have satisfactory welding resistance.

The average of $N_{Si}/(N_{Ti}+N_{Si})$ may be 0.02 or more and 0.09 or less, 0.02 or more and 0.07 or less, or 0.02 or more and 0.05 or less.

In the first layer of the present embodiment, the average of the ratio of the number of carbon atoms $N_C$ to the sum of the number of carbon atoms $N_C$ and the number of nitrogen atoms $N_N$, $N_C/(N_C+N_N)$, is 0.60 or more and 0.85 or less. If the average of $N_C/(N_C+N_N)$ is 0.60 or more, the first layer improves in slidability. If the average of $N_C/(N_C+N_N)$ is 0.85 or less, the first layer can have satisfactory breakage resistance.

The average of $N_C/(N_C+N_N)$ may be 0.65 or more and 0.85 or less, 0.70 or more and 0.85 or less, or 0.75 or more and 0.85 or less.

In the present disclosure, the average of $N_{Si}/(N_{Ti}+N_{Si})$ and the average of $N_C/(N_C+N_N)$ in the first layer are measured in the following procedure.

(A1) The cutting tool is cut out along the normal line of the surface of the cutting tool with diamond wire to expose the section of the first layer. The exposed section is subjected to focused ion beam processing (hereinafter also referred to as "FIB processing") to be mirror-finished.

(A2) The section of the first layer is subjected to rectangular analysis with an energy dispersive X-ray spectroscope (EDX) attached to a transmission electron microscope (TEM) (TEM-EDX) to specify the composition of the first layer. The rectangular analysis is performed in three unoverlapped rectangular measurement regions with a size of 0.5 µm×2 µm set in the section of the first layer. $N_{Si}/(N_{Ti}+N_{Si})$ and $N_C/(N_C+N_N)$ are calculated in each of the three measurement regions. The average of $N_{Si}/(N_{Ti}+N_{Si})$ at the three measurement regions and the average of $N_C/(N_C+N_N)$ at the three measurement regions are calculated. The averages thereof correspond to the average of $N_{Si}/(N_{Ti}+N_{Si})$ and the average of $N_C/(N_C+N_N)$ in the first layer.

It has been confirmed that even though the ratios of the identical sample are measured at randomly changed selected points in the measurement visual field multiple times, the results of measurement scarcely vary.

<<Structure of First Layer>>

In the present embodiment, the first layer has a columnar structure. In this case, the first layer is resistant to stress in the shear direction, and improves in abrasion resistance. Furthermore, since the first layer has few grain boundaries in the direction vertical to the film thickness, the first layer has few starting points of destruction, and also improves in breakage resistance.

In the present disclosure, the first layer has a columnar structure, and this means that the percentage of the number of first hard particles having an aspect ratio of 3 or more N1 to the number of all the hard particles constituting the first layer N, (N1/N)×100, is 60% or more. It is specifically confirmed in the following procedure that the first layer has a columnar structure.

(B1) The cutting tool is cut out along the normal line of the surface of the cutting tool with diamond wire to expose the section of the first layer. The exposed section is subjected to FIB processing to be mirror-finished.

(B2) The section subjected to FIB processing is EBSD-analyzed with a field emission scanning electron microscope (FE-SEM) comprising an electron backscatter diffraction apparatus (EBSD apparatus) (product name: "SUPRA35VP", which is available from Carl Zeiss) under the following measurement conditions. The regions to be EBSD-analyzed (hereinafter also referred to as analysis regions) are three unoverlapped rectangular regions set in the first layer. The analysis region is a rectangle having a side with a length of 20 µm or more in the direction parallel to the substrate. The length of the analysis regions in the thicknesswise direction of the coating can be suitably set depending on the thickness of the first layer. For example, the length of the analysis regions in the thicknesswise direction of the coating is set at 90% or more of the thickness of the first layer.

(Measurement Conditions)
Acceleration voltage: 15 kV
Current value: 1.8 nA
Irradiation current: 60 µm (HC is present.)
Exp: Long 0.03 s
Binning: 8×8
WD: 15 mm
Tilt: 70°
Step size: 0.02 µm
BKD: Background Subtraction,
  Dynamic Background Subtraction,
  Normalize Intensity histogram
Photographic magnification: 20000 times
Grain boundary definition: 15° or more (B3) Among data collected by EBSD analysis, only data satisfying CI>0.1 are recognized by a CI Dilation method (single Interation) and Grain CI standardization to perform clean-up processing. The CI value is calculated by the Voting method. The CI value is specifically found in accordance with the expression CI=(V1−V2)/Videal (V1: First solution, V2: Second solution, Videal: Ideal solution).

(B4) The above-mentioned results of the EBSD analysis are assayed by commercially available software (trade name: "OIM7.1", which is available from TSL Solutions) to make IPF maps (inverse pole Figure maps) of the above-mentioned analysis regions. If the misorientation between adjacent measurement points is 15° or more, a crystal grain boundary is defined therebetween for making the IPF maps. The IPF maps show the shapes of crystal grains, and also show the orientations of the crystal grains classified by color.

(B5) The aspect ratios of all the hard particles in the IPF maps of the analysis regions are measured by the above-mentioned software ("OIM7.1"). The aspect ratio of one of the hard particles is the ratio of the minor axis b to the major axis a of the hard particles, namely b/a. In the present disclosure, the major axis a is the maximum diameter of the hard particle observed in the above-mentioned section, and the minor axis b is the maximum diameter of the hard particle along the direction orthogonal to the major axis a. In the present disclosure, the hard particles in the IPF maps of the analysis regions include both of hard particles entirely included in the IPF maps of the analysis regions and hard particles at least partially included in the IPF maps of the analysis regions.

(B6) The percentage of the number of first hard particles having an aspect ratio of 3 or more n1 to the number of all the hard particles n in each of the IPF maps of the analysis regions, (n1/n)×100, is calculated. The average of the percentages, (n1/n)×100, in the IPF maps of the three analysis regions corresponds to the percentage of the number of first hard particles having an aspect ratio of 3 or more N1 to the number of all the hard particles constituting the first layer N, (N1/N)×100. If the percentage (N1/N)×100 is 60% or more, it is confirmed that the first layer has a columnar structure.

It has been confirmed that even though the percentages of the identical sample are measured at changed positions to be cut of the cutting tool or in changed measurement regions multiple times, the results of measurement scarcely vary.

<Hard Particles>
<<Composition of Hard Particles>

In the present embodiment, the hard particles consist of titanium, silicon, carbon, and nitrogen. As long as the effect of the present disclosure is not deteriorated, the hard particles can contain inevitable impurity elements besides titanium, silicon, carbon, and nitrogen. The hard particles may consist of titanium, silicon, carbon, nitrogen, and inevitable impurity elements. Examples of the inevitable impurity elements include chlorine, cobalt, tungsten, and oxygen. For example, the content of the inevitable impurity elements in the hard particles can be 0.5% by atom or less. The contents of the inevitable impurity elements in the hard particles are measured with a TEM-EDX.

<<Crystal Structure of Hard Particles>>

In the present embodiment, the hard particles have a cubic crystal structure. If the hard particles have a cubic crystal structure, the first layer has both high abrasion resistance and high toughness. It can be confirmed by selected area electron diffraction pattern analysis that the hard particles have a cubic crystal structure.

<<Compositions of First Unit Layers and Second Unit Layers>

In the present embodiment, the hard particles have a stacked structure in which the first unit layers and the second unit layers are stacked alternately. The first unit layers and the second unit layers each consist of titanium, silicon, carbon, and nitrogen. As long as the effect of the present disclosure is not deteriorated, the first unit layers and the second unit layers can each contain inevitable impurity elements besides titanium, silicon, carbon, and nitrogen. The first unit layers and the second unit layers may each consist of titanium, silicon, carbon, nitrogen, and the inevitable impurity elements. Examples of the inevitable impurity elements include chlorine, cobalt, tungsten, and oxygen. The first unit layers and the second unit layers can each contain the inevitable impurity elements, for example, at 0.5% by atom or less. The contents of the inevitable impurity elements in each of the first unit layers and the second unit layers are measured with a TEM-EDX.

In the present embodiment, the ratio of the number of silicon atoms to the sum of the number of titanium atoms and the number of silicon atoms in the first unit layers, x1, is higher than the ratio of the number of silicon atoms to the sum of the number of titanium atoms and the number of silicon atoms in the second unit layers, x2. The ratio of the number of carbon atoms to the sum of the number of carbon atoms and the number of nitrogen atoms in the first unit layers, y1, is higher than the ratio of the number of carbon atoms to the sum of the number of carbon atoms and the number of nitrogen atoms in the second unit layers, y2.

It is confirmed by the following procedure that x1 is higher than x2, and y1 is higher than y2.

(C1) The cutting tool is cut out along the normal line of the surface of the cutting tool with diamond wire to expose the section of the first layer. The exposed section is subjected to FIB processing to be mirror-finished.

(C2) The section subjected to the FIB processing is observed through a bright field scanning electron microscope (BF-SEM) to obtain a BF-STEM image.

(C3) In the above-mentioned BF-STEM image, the observation specifies layers shown as white (hereinafter also referred to as "white layers") and layers shown as black (hereinafter also referred to as "black layers"). The black layers are regions containing silicon at a high content, and correspond to the first unit layers. The white layers are regions containing silicon at a low content, and correspond to the second unit layers.

(C4) Five first unit layers are randomly selected and subjected to elemental analysis to specify the compositions. x1 and y1 of the first unit layers are obtained. The compositions of the first unit layers are represented as $Ti_{(1-x1)}Si_{x1}C_{y1}N_{(1-y1)}$. Five second unit layers are randomly selected and subjected to elemental analysis to specify the compositions. x2 and y2 of the second unit layers are obtained. The compositions of the second unit layers are represented as $Ti_{(1-x2)}Si_{x2}C_{y2}N_{(1-y2)}$. The conditions for the elemental analysis are as follows.

Spot diameter: 7c
Aperture size: 30 μm
Current value: 35 pA
Acceleration voltage: 200 kV If four or less first unit layers and four or less second unit layers are present, all the unit layers are subjected to elemental analysis to find the compositions of the unit layers. x1, x2, y1, and y2 are obtained.

If, in the present disclosure, the average of measured x1 of the first unit layers is higher than the average of measured x2 of the second unit layers, it is determined that the ratio of the number of silicon atoms to the sum of the number of titanium atoms and the number of silicon atoms in the first unit layers, x1, is higher than the ratio of the number of silicon atoms to the sum of the number of titanium atoms and the number of silicon atoms in the second unit layers, x2.

If, in the present disclosure, the average of measured y1 of the first unit layers is higher than the average of measured y2 of the second unit layers, it is determined that the ratio of the number of carbon atoms to the sum of the number of carbon atoms and the number of nitrogen atoms in the first unit layers, y1, is higher than the ratio of the number of carbon atoms to the sum of the number of carbon atoms and the number of nitrogen atoms in the second unit layers, y2.

If, in the above-mentioned (C3), the white layers and the black layers are stacked alternately, it is determined that the hard particles have a stacked structure in which the first unit layers and the second unit layers are stacked alternately.

It has been confirmed that even though the identical sample is measured with a change of hard particles to be specified in (C2) multiple times, the results of measurement scarcely vary.

x1 may be 0.01 or more and 0.11 or less, 0.02 or more and 0.08 or less, or 0.02 or more and 0.06 or less. y1 may be 0.60 or more and 0.85 or less, 0.65 or more and 0.85 or less, or 0.70 or more and 0.85 or less.

The difference between x1 and x2, (x1−x2), may be 0.01 or more and 0.07 or less, 0.02 or more and 0.06 or less, or 0.02 or more and 0.05 or less. The difference between x1 and x2, (x1-x2), as used herein is the difference between the average of x1 of the first unit layers and the average of x2 of the second unit layers.

The difference between y1 and y2, (y1−y2), may be 0.01 or more and 0.10 or less, 0.01 or more and 0.08 or less, or 0.02 or more and 0.08 or less. The difference between y1 and y2, (y1−y2), as used herein is the difference between the average of y1 of the first unit layers and the average of y2 of the second unit layers.

As the above-mentioned ranges of x1, x2, y1, y2, x1-x2, and y1-y2, the above-mentioned ranges can be optionally combined.

It can be stated that the first unit layers are layers of $Ti_{(1-x1)}Si_{x1}C_{y1}N_{(1-y1)}$, and the second unit layers are layers of $Ti_{(1-x2)}Si_{x2}C_{y2}N_{(1-y2)}$ with the proviso that x1 and x2 satisfy the relationship x1>x2, and y1 and y2 satisfy the relationship y1>y2.

<<Average Thickness of First Unit Layers and Average Thickness of Second Unit Layers>>

In the present disclosure, the first unit layers may have an average thickness of 2 nm or more and 15 nm or less, and the second unit layers may have an average thickness of 2 nm or more and 15 nm or less. This improves the effect of suppressing the development of cracks on the interfaces between the first unit layers and the second unit layers. The first unit layers may have an average thickness of 3 nm or more and 10 nm or less, or 3 nm or more and 8 nm or less. The second unit layers may have an average thickness of 3 nm or more and 10 nm or less, or 3 nm or more and 8 nm or less.

<<Average of the Total Thickness of First Unit Layer and Second Unit Layer Adjacent Thereto>

A first unit layer and a second unit layer adjacent thereto may have a total thickness of 4 nm or more and 30 nm or less, 6 nm or more and 20 nm or less, or 6 nm or more and 12 nm or less. The first unit layer and the second unit layer adjacent thereto means one of the first unit layers and one of the second unit layers that are adjacent to each other. The total thickness of the first unit layer and the second unit layer adjacent thereto corresponds to the average of the total thicknesses of five pairs of first unit layers and second unit layers.

<<Thickness of First Layer>>

In the present embodiment, the first layer may have a thickness of 1.0 μm or more and 15 μm or less. If the first layer has a thickness of 1.0 μm or more, the first layer can have high abrasion resistance. Meanwhile, if the first layer has a thickness of 15 μm or less, this enables inhibiting the coating from being exfoliated or broken by great stress applied between the coating and the substrate during cutting machining. The first layer may have a thickness of 4 μm or more and 15 μm or less, or 6 μm or more and 10 μm or less.

<Second Layer>

The coating of the present embodiment may comprise the second layer disposed between the substrate and the first layer. The second layer may comprise at least one selected from the group consisting of a TiN layer, a TiC layer, a TiCN layer, a TiBN layer, a TiCNO layer, and an $Al_2O_3$ layer.

If the TiN layer, the TiC layer, the TiCN layer, the TiBN layer, or the TICNO layer is disposed as the second layer directly on the substrate, the adhesion between the coating and the substrate can be enhanced. The use of the $Al_2O_3$ layer as the second layer enables enhancing the oxidation resistance of the coating. The second layer may have an average thickness of 0.1 μm or more and 20 μm or less. This enables the coating to have high abrasion resistance and breakage resistance.

<Third Layer>

The coating of Embodiment 1 may comprise the third layer disposed on the side of the first layer nearer to the surface of the coating. The third layer may comprise at least one selected from the group consisting of a TiN layer, a TiC layer, a TiCN layer, a TiBN layer, a TiCNO layer, and an $Al_2O_3$ layer. Since the TiN layer has a clear color (exhibits a gold color), disposing the TiN layer as the third layer on the outermost surface of the coating advantageously enables facilitating the discrimination of used portions of the cutting tool after use for cutting machining. The use of the TiC layer, the TiCN layer, the TiBN layer, or the TICNO layer as the third layer enables improving the slidability of the coating. The use of the $Al_2O_3$ layer as the third layer enables enhancing the oxidation resistance of the coating.

The third layer may have an average thickness of 0.5 μm or more and 10 μm or less. This enables improving the adhesion between the third layer and the layer adjacent thereto.

Embodiment 2: Method for Manufacturing Cutting Tool

An exemplary method for manufacturing the cutting tool according to Embodiment 1 will be described. The method for manufacturing the cutting tool according to Embodiment 1 can comprise the first step of preparing a substrate and the second step of forming a coating on the substrate to obtain the cutting tool.

<First Step>

In the first step, the substrate is prepared. Since details of the substrate is described in Embodiment 1, the description thereof is not repeated.

<Second Layer>

In the second step, the coating is then formed on the substrate to obtain the cutting tool. The coating is formed, for example, with a CVD apparatus shown in FIG. 5. In CVD apparatus 50, multiple substrate-setting jigs 52 holding substrates 10 can be installed, and these are covered with a reaction vessel 53 made of heat-resistant alloy steel. Reaction vessel 53 is surrounded by a thermostat 54. This thermostat 54 can control the temperature in reaction vessel 53.

In CVD apparatus 50, a nozzle 56 with three gas flow channels through which raw material gases pass (a first gas flow channel 55, a second gas flow channel 57, and the other gas flow channel not shown in the figure) is disposed. The nozzle 56 is disposed through a region in which substrate-setting jigs 52 are disposed. Nozzle 56 has multiple injection holes for jetting the gases passed through the gas flow channels near substrate-setting jigs 52.

Figure 6:
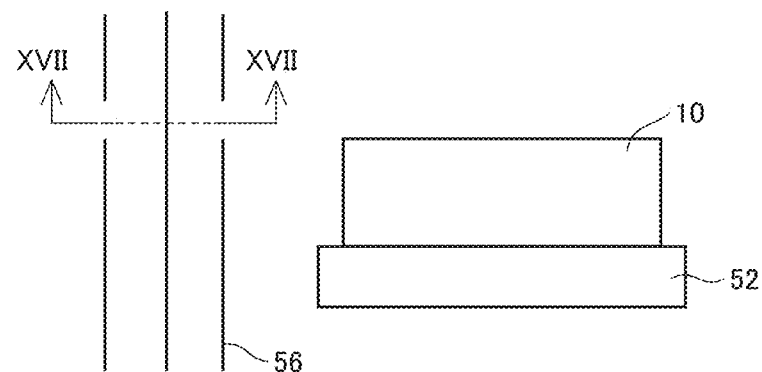
FIG. 6 is an enlarged view of the region VII in FIG. 5.
Figure 7:
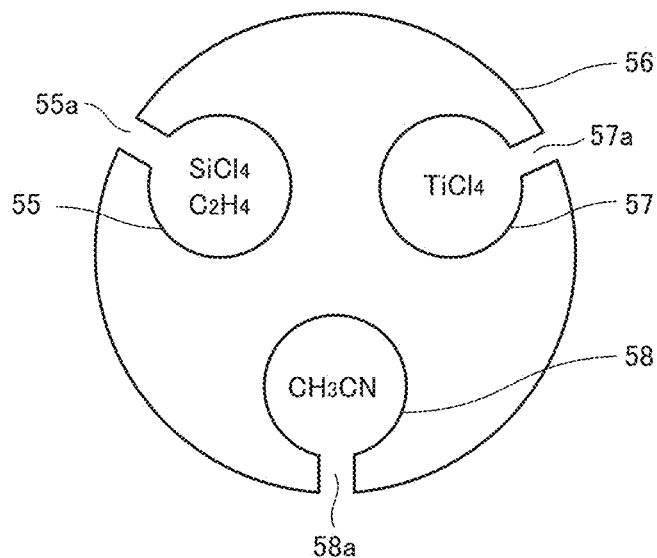
FIG. 7 is a sectional view of a nozzle 56 taken along the line XVII-XVII in FIG. 6.

FIG. 7 is a sectional view of nozzle 56 taken along the line XVII-XVII in FIG. 6. As shown in FIG. 7, nozzle 56 has first gas flow channel 55, second gas flow channel 57, and third gas flow channel 58. $SiCl_4$ gas and $C_2H_4$ gas pass through first gas flow channel 55, $TiCl_4$ gas passes through second gas flow channel 57, and $CH_3CN$ gas passes through third gas flow channel 58.

First gas flow channel 55 communicates with a first injection hole 55a. The gases passed through first gas flow channel 55 are injected from first injection hole 55a to the substrates. Second gas flow channel 57 communicates with a second injection hole 57a. The gas passed through second gas flow channel 57 is injected from second injection hole 57a to the substrates. Third gas flow channel 58 communicates with a third injection hole 58a. The gas passed through third gas flow channel 58 is injected from third injection hole 58a to the substrates.

For example, $H_2$ gas, $N_2$ gas, or Ar gas may be used as carrier gas. The carrier gas is injected from the first injection hole, the second injection hole, and the third injection hole. Gases containing the raw material gases and the carrier gas in the present disclosure are described as reaction gases.

The first layer is formed while the nozzle is rotated. Since this adsorbs the gas containing $SiCl_4$ and $C_2H_4$ at high concentrations and the gas containing $TiCl_4$ at high concentration onto the substrates alternately, the hard particles contained in the first layer can have the stacked structure in which the first unit layers and the second unit layers are stacked alternately. Therefore, the ratio of the number of silicon atoms to the sum of the number of titanium atoms and the number of silicon atoms in the first unit layers, x1, is higher than the ratio of the number of silicon atoms to the sum of the number of titanium atoms and the number of silicon atoms in the second unit layers, x2, and the ratio of the number of carbon atoms to the sum of the number of carbon atoms and the number of nitrogen atoms in the first unit layers, y1, is higher than the ratio of the number of carbon atoms to the sum of the number of carbon atoms and the number of nitrogen atoms in the second unit layers, y2.

In this step, the temperature of the substrates in the reaction vessel is 800° C. to 900° C., and the pressure in the reaction vessel is 50 hPa to 200 hPa. The flow rates of the raw material gases and the coating formation time can be adjusted to control the thickness of the first layer. The rotational speed of the nozzle and the coating formation times can be adjusted to control the average thickness of the first unit layers and the average thickness of the second unit layers.

The total gas flow rate of the reaction gases is adjusted to 90 L/minutes to 150 L/minutes during the formation of the first layer. The "total gas flow rate" as used herein refers to the total volumetric flow rate into the CVD furnace per unit time assuming that the gases under the standard conditions (0° C. and 1 atom) are ideal gases.

If the coating comprises at least one of the second layer, an intermediate layer, and the third layer, these layers can be formed by a conventionally known method.

(Other Steps)

The substrate having the coating is then cooled. For example, the rate of cooling does not exceed 5° C./min, and decreases with a reduction in the temperature of the substrate.

A heat treatment step such as annealing and a surface treatment step such as surface grinding or shot blasting can be performed besides the above-mentioned steps.

The cutting tool of Embodiment 1 can be obtained by the above-mentioned manufacturing method.

EXAMPLES

The present embodiments will be described by Examples further specifically. The present embodiments are not, however, limited by these Examples.

<Preparation of Substrate>

Substrates made of cemented carbide was prepared. The substrates have a composition of 6% by mass of Co and 1.5% by mass of NbC, with the balance being WC. The substrates have a shape of CNMG120408N-GU.

<Formation of Coating>

Coatings was formed on the substrates by CVD. Table 1 shows the configurations of the coatings and the thicknesses of the layers of the samples. The sign "–" as used in Table 1 means that the corresponding layer is absent. The first layer consists of multiple hard particles, and the hard particles consist of titanium, silicon, carbon, and nitrogen. The second layer and the third layer shown in Table 1 are formed by conventionally known CVD.

TABLE 1

| | Coating | | | | | | |
|---|---|---|---|---|---|---|---|
| | First layer | | | Second layer | | Third layer | |
| Sample No. | Average of $N_{Si}/(N_{Ti} + N_{Si})$ | Average of $N_C/(N_C + N_N)$ | Average thickness µm | Composition | Thickness µm | Composition | Thickness µm |
| 1 | 0.01 | 0.73 | 7.5 | — | — | — | — |
| 2 | 0.05 | 0.73 | 7.4 | — | — | — | — |
| 3 | 0.10 | 0.73 | 7.5 | — | — | — | — |
| 4 | 0.05 | 0.58 | 7.4 | — | — | — | — |
| 5 | 0.05 | 0.83 | 7.4 | — | — | — | — |
| 6 | 0.05 | 0.73 | 1.3 | — | — | — | — |
| 7 | 0.05 | 0.73 | 14.8 | — | — | — | — |
| 8 | 0.05 | 0.73 | 7.3 | TiN | 0.2 | — | — |
| 9 | 0.05 | 0.73 | 7.4 | — | — | $Al_2O_3$ | 3.2 |
| 10 | 0.05 | 0.73 | 7.4 | — | — | — | — |
| 11 | 0.05 | 0.73 | 7.4 | — | — | — | — |
| 12 | 0.05 | 0.73 | 0.9 | — | — | — | — |
| 13 | 0.05 | 0.73 | 16.3 | — | — | — | — |

TABLE 1-continued

| | Coating | | | | | | |
|---|---|---|---|---|---|---|---|
| | First layer | | | Second layer | | Third layer | |
| Sample No. | Average of $N_{Si}/(N_{Ti}+N_{Si})$ | Average of $N_C/(N_C+N_N)$ | Average thickness μm | Composition | Thickness μm | Composition | Thickness μm |
| 14 | 0.05 | 0.73 | 7.3 | — | — | — | — |
| 15 | 0.05 | 0.73 | 7.4 | — | — | — | — |
| 16 | 0.05 | 0.73 | 7.4 | — | — | — | — |
| 17 | 0.05 | 0.73 | 7.4 | — | — | — | — |
| 1-1 | 0.004 | 0.73 | 7.4 | — | — | — | — |
| 1-2 | 0.115 | 0.73 | 7.5 | — | — | — | — |
| 1-3 | 0.05 | 0.53 | 7.5 | — | — | — | — |
| 1-4 | 0.05 | 0.88 | 7.4 | — | — | — | — |
| 1-5 | 0.05 | 0.80 | 7.4 | — | — | — | — |
| 1-6 | 0.05 | 0.73 | 7.4 | — | — | — | — |

Figure 5:
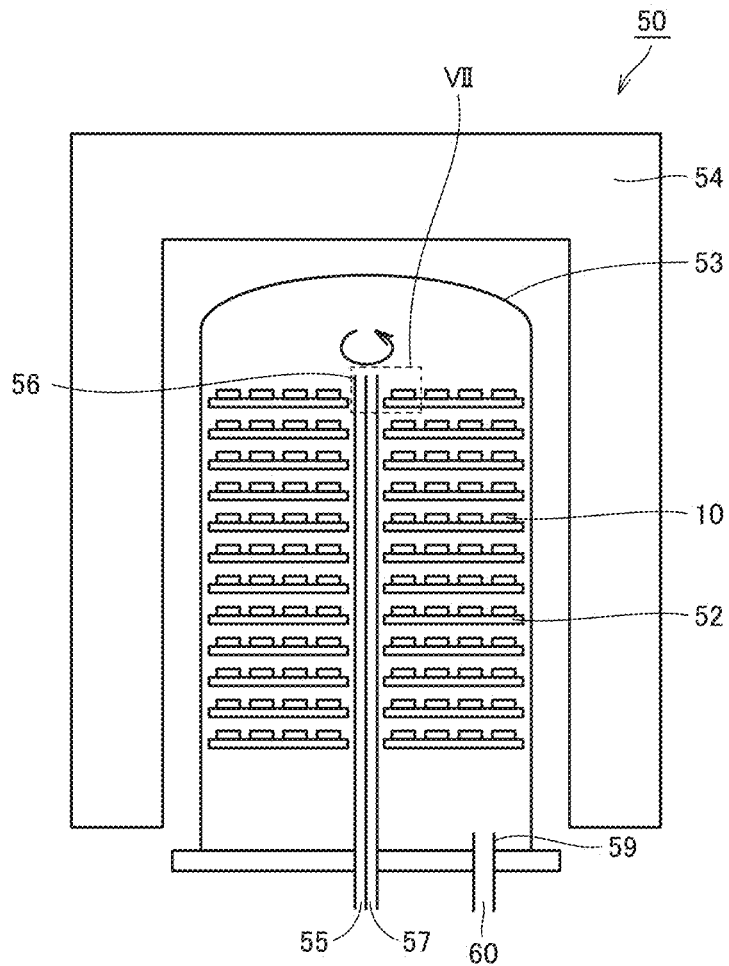
FIG. 5 is a schematic sectional view of an exemplary CVD apparatus for a method for manufacturing a cutting tool according to Embodiment 2.

The first layers of the samples are formed with the CVD apparatus shown in FIG. 5. Nozzle 56 shown in FIG. 7 was used for manufacturing samples described as "A" in the column "Type" of the column "Nozzle" in Table 2. SiCl$_4$ gas and C$_2$H$_4$ gas passed through first gas flow channel 55 of nozzle 56, TiCl$_4$ gas passed through second gas flow channel 57, and CH$_3$CN gas passed through third gas flow channel 58.

Figure 8:
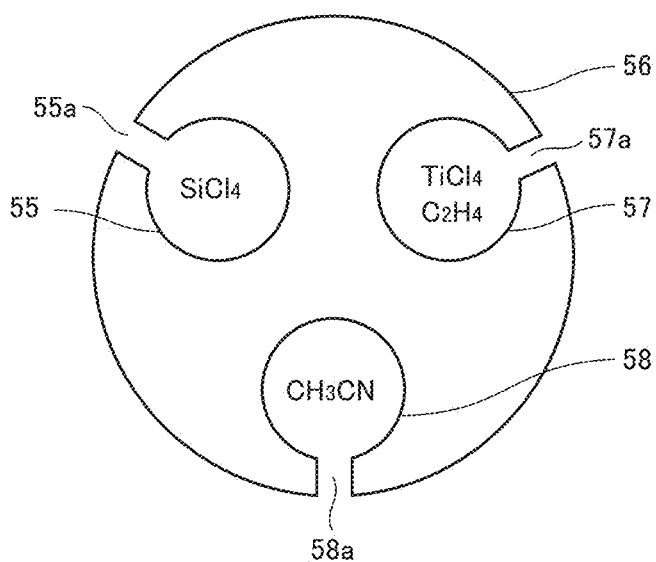
FIG. 8 is a sectional view of a nozzle used for Sample 1-6.

Nozzle 56 shown in FIG. 8 was used for manufacturing the sample described as "B" in the column "Type" of the column "Nozzle" in Table 2. SiCl$_4$ gas passed through first gas flow channel 55 of nozzle 56, TiCl$_4$ gas and C$_2$H$_4$ gas passed through second gas flow channel 57, and CH$_3$CN gas passed through third gas flow channel 58.

The gas passed through first gas flow channel 55 was injected from first injection hole 55a to the substrates. The gas passed through second gas flow channel 57 was injected from second injection hole 57a to the substrates. The gas passed through third gas flow channel 58 was injected from third injection hole 58a to the substrates.

Table 2 shows the percentage of V1 to V, (V1/V)×100; the percentage of V2 to V, (V2/V)×100; the number of rotation of the nozzle; the temperature of the substrate; and the pressure in the manufacturing of each sample with the proviso that V1 represents the volumetric flow rate of SiCl$_4$, V2 represents the volumetric flow rate of C$_2$H$_4$, and V represents the total volumetric flow rate of the reaction gases in the formation of the first layer.

TABLE 2

| | Conditions for forming first layer | | | | | |
|---|---|---|---|---|---|---|
| | | | Nozzle | | Temperature | |
| Sample No. | (V1/V) × 100 % | (V2/V) × 100 % | Type | The number of rotation rpm | of substrate ° C. | Pressure hPa |
| 1 | 0.4 | 1.5 | A | 3.1 | 828 | 67 |
| 2 | 2.0 | 1.5 | A | 2.9 | 860 | 90 |
| 3 | 3.8 | 1.5 | A | 2.9 | 880 | 150 |
| 4 | 2.0 | 1.2 | A | 2.9 | 860 | 70 |
| 5 | 2.0 | 1.7 | A | 2.9 | 860 | 80 |
| 6 | 2.0 | 1.5 | A | 3.0 | 860 | 85 |
| 7 | 2.0 | 1.5 | A | 2.9 | 860 | 90 |
| 8 | 2.0 | 1.5 | A | 2.8 | 860 | 90 |
| 9 | 2.0 | 1.5 | A | 2.9 | 860 | 95 |
| 10 | 2.0 | 1.5 | A | 4.8 | 860 | 80 |
| 11 | 2.0 | 1.5 | A | 0.7 | 860 | 75 |
| 12 | 2.0 | 1.5 | A | 2.9 | 860 | 90 |
| 13 | 2.0 | 1.5 | A | 2.9 | 860 | 90 |
| 14 | 2.0 | 1.5 | A | 5.6 | 860 | 90 |
| 15 | 2.0 | 1.5 | A | 0.6 | 860 | 90 |
| 16 | 2.0 | 1.5 | A | 2.9 | 860 | 80 |
| 17 | 2.0 | 1.5 | A | 2.9 | 870 | 110 |
| 1-1 | 0.2 | 1.5 | A | 2.9 | 823 | 80 |
| 1-2 | 4.6 | 1.5 | A | 2.9 | 890 | 200 |
| 1-3 | 2.0 | 1.1 | A | 2.9 | 860 | 80 |
| 1-4 | 2.0 | 1.8 | A | 2.9 | 860 | 120 |
| 1-5 | 2.0 | 1.5 | A | 2.9 | 900 | 280 |
| 1-6 | 2.0 | 1.5 | B | 2.9 | 860 | 75 |

The substrates were then cooled to obtain cutting tools as samples.

<Configuration of First Layer>

The sections of the first layers in the cutting tools as the samples were observed with a bright field scanning electron microscope (BF-SEM), so that it was confirmed that the first layer consisted of multiple hard particles. It was confirmed that the hard particles of samples described as "Present" in the column "Stacked structure" in Table 3 had a stacked structure in which the first unit layers and the second unit layers were stacked alternately. The hard particles of a sample described as "Absent" in the column "Stacked structure" in Table 3 did not have a stacked structure. The hard particles of cutting tools as the samples consist of titanium, silicon, carbon, and nitrogen.

<Crystal Structure of Hard Particles>

In the first layers of the cutting tools as the samples, the crystal structures of the hard particles were confirmed by selected area electron diffraction pattern analysis. Table 3 shows the results. The "Cubic" in Table 3 indicates that the hard particles have a cubic crystal structure. The "Amorphous" in Table 3 indicates that the hard particles were amorphous.

<Structure of First Layer>

The first layers of the cutting tools as the samples were measured for the percentage of the number of first hard particles having an aspect ratio of 3 or more N1 to the number of all the hard particles constituting the first layer N, (N1/N)×100. A specific measuring method therefor is as described in Embodiment 1. If the percentage, (N1/N)×100, is 60% or more, it is determined that the first layer has a columnar structure. If the percentage, (N1/N)×100, is less than 60%, it is determined that the first layer consists of granular crystals. Table 3 shows the results of determination.

<Composition of First Layer>

The cutting tools as the samples were measured for, in the first layers, the average of the ratio of the number of silicon atoms $N_{Si}$ to the sum of the number of titanium atoms $N_{Ti}$ and the number of silicon atoms $N_{Si}$, $N_{Si}/(N_{Ti}+N_{Si})$, and the average of the ratio of the number of carbon atoms $N_C$ to the sum of the number of carbon atoms $N_C$ and the number of nitrogen atoms $N_N$, $N_C/(N_C+N_N)$, with a TEM-EDX. The specific measuring method therefor is as described in Embodiment 1. Table 1 shows the results.

<Compositions of First Unit Layers and Second Unit Layers>

Five first unit layers and five second unit layers in hard particles of each of the cutting tools as the samples were randomly selected. The compositions of the unit layers were specified to obtain x1, x2, y1, and y2 in the composition of the first unit layers, $Ti_{(1-x1)}Si_{x1}C_{y1}N_{(1-y1)}$, and the composition of the second unit layers, $Ti_{(1-x2)}Si_{x2}C_{y2}N_{(1-y2)}$. The specific method for confirming the compositions is as described in Embodiment 1. Table 4 shows the results. Since Sample 1-5 did not have a stacked structure, the sign "–" was described.

<Average Thickness of First Unit Layers and Average Thickness of Second Unit Layers>

The hard particles of each cutting tool as the sample were measured for the average thickness of the first unit layers, d1, and the average thickness of the second unit layers, d2. The specific measuring method therefor is as described in Embodiment 1. Table 4 shows the results. The average of the total thickness of a first unit layer and a second unit layer adjacent thereto was determined based on the obtained results. The results are shown in the column "d1+d2" of Table 4.

TABLE 3

| Sample No. | First layer Structure | Hard particles Stacked structure | Crystal structure |
|---|---|---|---|
| 1 | Columnar structure | Present | Cubic |
| 2 | Columnar structure | Present | Cubic |
| 3 | Columnar structure | Present | Cubic |
| 4 | Columnar structure | Present | Cubic |
| 5 | Columnar structure | Present | Cubic |
| 6 | Columnar structure | Present | Cubic |
| 7 | Columnar structure | Present | Cubic |
| 8 | Columnar structure | Present | Cubic |
| 9 | Columnar structure | Present | Cubic |
| 10 | Columnar structure | Present | Cubic |
| 11 | Columnar structure | Present | Cubic |
| 12 | Columnar structure | Present | Cubic |
| 13 | Columnar structure | Present | Cubic |
| 14 | Columnar structure | Present | Cubic |
| 15 | Columnar structure | Present | Cubic |
| 16 | Columnar structure | Present | Cubic |
| 17 | Columnar structure | Present | Cubic |
| 1-1 | Columnar structure | Present | Cubic |
| 1-2 | Columnar structure | Present | Cubic |
| 1-3 | Columnar structure | Present | Cubic |
| 1-4 | Columnar structure | Present | Cubic |
| 1-5 | Granular crystal | Absent | Amorphous |
| 1-6 | Columnar structure | Present | Cubic |

TABLE 4

| | Hard particles | | | | | |
|---|---|---|---|---|---|---|
| | First unit layer $Ti_{(1-x1)}Si_{x1}C_{y1}N_{(1-y1)}$ | | | Second unit layer $Ti_{(1-x2)}Si_{x2}C_{y2}N_{(1-y2)}$ | | |
| Sample No. | x1 | y1 | Average thickness d1 nm | x2 | y2 | Average thickness d2 nm | d1 + d2 |
| 1 | 0.015 | 0.75 | 3.1 | 0.005 | 0.70 | 3.3 | 6.4 |
| 2 | 0.065 | 0.75 | 3.5 | 0.035 | 0.70 | 3.3 | 6.8 |
| 3 | 0.105 | 0.75 | 3.5 | 0.080 | 0.70 | 3.5 | 7.0 |
| 4 | 0.065 | 0.60 | 3.3 | 0.035 | 0.55 | 3.5 | 6.8 |
| 5 | 0.065 | 0.85 | 3.4 | 0.035 | 0.80 | 3.4 | 6.8 |
| 6 | 0.065 | 0.75 | 3.4 | 0.035 | 0.70 | 3.3 | 6.7 |
| 7 | 0.065 | 0.75 | 3.6 | 0.035 | 0.70 | 3.3 | 6.9 |
| 8 | 0.065 | 0.75 | 3.6 | 0.035 | 0.70 | 3.5 | 7.1 |
| 9 | 0.065 | 0.75 | 3.4 | 0.035 | 0.70 | 3.4 | 6.8 |
| 10 | 0.065 | 0.75 | 2.1 | 0.035 | 0.70 | 2.1 | 4.2 |
| 11 | 0.065 | 0.75 | 14.8 | 0.035 | 0.70 | 14.9 | 29.7 |
| 12 | 0.065 | 0.75 | 3.4 | 0.035 | 0.70 | 3.4 | 6.8 |
| 13 | 0.065 | 0.75 | 3.4 | 0.035 | 0.70 | 3.4 | 6.8 |
| 14 | 0.065 | 0.75 | 1.8 | 0.035 | 0.70 | 1.8 | 3.6 |
| 15 | 0.065 | 0.75 | 15.5 | 0.035 | 0.70 | 15.5 | 31.0 |
| 16 | 0.065 | 0.76 | 3.5 | 0.035 | 0.74 | 3.3 | 6.8 |
| 17 | 0.065 | 0.80 | 3.5 | 0.035 | 0.70 | 3.3 | 6.8 |
| 1-1 | 0.005 | 0.75 | 3.4 | 0.003 | 0.70 | 3.4 | 6.8 |
| 1-2 | 0.120 | 0.75 | 3.4 | 0.100 | 0.70 | 3.4 | 6.8 |
| 1-3 | 0.065 | 0.55 | 3.5 | 0.035 | 0.50 | 3.4 | 6.9 |
| 1-4 | 0.065 | 0.90 | 3.5 | 0.035 | 0.85 | 3.4 | 6.9 |
| 1-5 | — | — | — | — | — | — | — |
| 1-6 | 0.065 | 0.70 | 3.4 | 0.035 | 0.75 | 3.4 | 6.8 |

<Cutting Test>

Cutting was performed with the cutting tools as the samples under the following conditions. The cutting time was measured until the amount of wear on the flank face reached 0.3 mm. Longer cutting time means a longer tool life. Table 5 shows the results.

<Cutting Conditions>

Material to be cut: round rod-shaped SCM415 material
Holder: DCLNR2525M12
Insert: CNMG120408N-GU
Cutting speed Vc: 300 m/min
Feed f: 0.3 mm/rev
Cutting depth ap: 1.5 mm
Cutting fluid: present (WET)

TABLE 5

| Sample No. | Cutting test Cutting time (minute) |
|---|---|
| 1 | 36 |
| 2 | 39 |
| 3 | 34 |
| 4 | 33 |
| 5 | 37 |
| 6 | 30 |
| 7 | 42 |
| 8 | 36 |
| 9 | 40 |
| 10 | 33 |

TABLE 5-continued

| Sample No. | Cutting test Cutting time (minute) |
|---|---|
| 11 | 34 |
| 12 | 23 |
| 13 | 25 |
| 14 | 25 |
| 15 | 23 |
| 16 | 39 |
| 17 | 39 |
| 1-1 | 13 |
| 1-2 | 15 |
| 1-3 | 17 |
| 1-4 | 18 |
| 1-5 | 12 |
| 1-6 | 19 |

DISCUSSION

The cutting tools as Samples 1 to 17 correspond to Examples, and the cutting tools as Samples 1-1 to 1-6 correspond to Comparative Examples. It was confirmed that the cutting tools of Examples had longer lives than the cutting tools of Comparative Examples. Since the cutting tools of Examples were high in hardness and oxidation resistance, and improved in the slidability of the first unit layers, welding was suppressed, so that abrasion due to the welding was also suppressed.

Although the embodiments and Examples of the present disclosure were described as mentioned above, it has been originally expected that the embodiments and Examples mentioned above are optionally combined or variously modified. The embodiments and Examples disclosed this time are exemplary in all respects, and should be considered to be unlimited. The scope of the present invention is indicated by Claims rather than by the above-mentioned embodiments and Examples. The scope of the present invention is intended to include all the modifications within the scope and meaning equivalent to Claims.

REFERENCE SIGNS LIST

1 Cutting tool; 10 Substrate; 11 First layer; 12 Second layer; 13 Third layer; 15 Coating; 50 CVD apparatus; 52 Substrate-setting jig; 53 Reaction vessel; 54 Thermostat; 55 First gas flow channel; 55a First injection hole; 56 Nozzle; 57 Second gas flow channel; 57a Second injection hole; 58 Third gas flow channel; 58a Third injection hole; 59 Exhaust pipe; 60 Exhaust port.

The invention claimed is:

1. A cutting tool, comprising a substrate and a coating disposed on the substrate,
   wherein the coating comprises a first layer,
   the first layer consists of multiple hard particles,
   the hard particles consist of titanium, silicon, carbon, and nitrogen,
   the hard particles have a cubic crystal structure,
   the first layer has a columnar structure,
   in the first layer, an average of a ratio of the number of atoms of the silicon $N_{Si}$ to a sum of the number of atoms of the titanium $N_{Ti}$ and the number of atoms of the silicon $N_{Si}$, $N_{Si}/(N_{Ti}+N_{Si})$, is 0.01 or more and 0.10 or less,
   in the first layer, an average of a ratio of the number of atoms of the carbon $N_C$ to a sum of the number of atoms of the carbon $N_C$ and the number of atoms of the nitrogen $N_N$, $N_C/(N_C+N_N)$, is 0.60 or more and 0.85 or less,
   the hard particles have a stacked structure in which first unit layers and second unit layers are stacked alternately,
   the first unit layers and the second unit layers each consist of titanium, silicon, carbon, and nitrogen,
   a ratio of the number of atoms of the silicon to a sum of the number of atoms of the titanium and the number of atoms of the silicon in the first unit layers, x1, is higher than a ratio of the number of atoms of the silicon to a sum of the number of atoms of the titanium and the number of atoms of the silicon in the second unit layers, x2, and
   a ratio of the number of atoms of the carbon to a sum of the number of atoms of the carbon and the number of atoms of the nitrogen in the first unit layers, y1, is higher than a ratio of the number of atoms of the carbon to a sum of the number of atoms of the carbon and the number of atoms of the nitrogen in the second unit layers, y2.

2. The cutting tool according to claim 1,
   wherein the first unit layers have an average thickness of 2 nm or more and 15 nm or less, and
   the second unit layers have an average thickness of 2 nm or more and 15 nm or less.

3. The cutting tool according to claim 1, wherein an average of a total thickness of a first unit layer and a second unit layer adjacent thereto is 4 nm or more and 30 nm or less.

4. The cutting tool according to claim 1, wherein the first layer has a thickness of 1.0 μm or more and 15 μm or less.

5. The cutting tool according to claim 1,
   wherein the coating comprises a second layer disposed between the substrate and the first layer, and
   the second layer comprises at least one selected from the group consisting of a TiN layer, a TiC layer, a TiCN layer, a TiBN layer, a TiCNO layer, and an $Al_2O_3$ layer.

6. The cutting tool according to claim 1,
   wherein the coating comprises a third layer disposed on a side of the first layer nearer to a surface of the coating, and
   the third layer is a TiN layer, a TiC layer, a TiCN layer, a TiBN layer, a TiCNO layer, and an $Al_2O_3$ layer.

7. The cutting tool according to claim 1,
   wherein the x1 is 0.01 or more and 0.11 or less, and
   the y1 is 0.60 or more and 0.85 or less.

8. The cutting tool according to claim 1,
   wherein a difference between the x1 and the x2 is 0.01 or more and 0.07 or less, and
   a difference between the y1 and the y2 is 0.01 or more and 0.10 or less.

* * * * *